(12) United States Patent
Liu et al.

(10) Patent No.: US 7,751,632 B2
(45) Date of Patent: Jul. 6, 2010

(54) INTELLIGENT, DYNAMIC, LONG-TERM DIGITAL SURVEILANCE MEDIA STORAGE SYSTEM

(75) Inventors: Lipin Liu, Belle Mead, NJ (US); K. C. Lee, Princeton Jct., NJ (US); Hasan Timucin Ozdemir, Plainsboro, NJ (US)

(73) Assignee: Panasonic Corporation, Osaka (JP)

( * ) Notice: Subject to any disclaimer, the term of this patent is extended or adjusted under 35 U.S.C. 154(b) by 956 days.

(21) Appl. No.: 11/058,558

(22) Filed: Feb. 15, 2005

(65) Prior Publication Data

US 2006/0182357 A1    Aug. 17, 2006

(51) Int. Cl.
G06K 9/36 (2006.01)
G06K 9/46 (2006.01)
G06K 9/54 (2006.01)
G06K 9/60 (2006.01)

(52) U.S. Cl. .................. 382/239; 382/236; 382/305

(58) Field of Classification Search .......... 382/232, 382/239, 305; 345/555; 348/143; 358/403, 358/404, 426.02, 426.05, 426.06; 707/204
See application file for complete search history.

(56) References Cited

U.S. PATENT DOCUMENTS

| | | | | |
|---|---|---|---|---|
| 5,272,529 A * | 12/1993 | Frederiksen | ........... | 375/240.22 |
| 5,602,594 A * | 2/1997 | Cho et al. | ........... | 375/240.05 |
| 5,657,087 A * | 8/1997 | Jeong et al. | ........... | 375/240.16 |
| 5,894,333 A * | 4/1999 | Kanda et al. | ............. | 348/597 |
| 6,597,738 B1 * | 7/2003 | Park et al. | ........... | 375/240.16 |
| 6,671,454 B1 * | 12/2003 | Kaneko et al. | ........... | 386/83 |
| 6,681,058 B1 * | 1/2004 | Hanna et al. | ............. | 382/294 |
| 7,069,342 B1 * | 6/2006 | Biederman | ............. | 709/247 |
| 7,177,355 B1 * | 2/2007 | Wen et al. | ............. | 375/240 |
| 2001/0021268 A1 * | 9/2001 | Jun et al. | ............. | 382/165 |
| 2001/0036271 A1 * | 11/2001 | Javed | ............. | 380/217 |
| 2002/0114525 A1 * | 8/2002 | Bolle et al. | ............. | 382/232 |
| 2003/0154344 A1 * | 8/2003 | Itoi | ............. | 711/100 |
| 2003/0210821 A1 * | 11/2003 | Yogeshwar et al. | ......... | 382/232 |
| 2004/0042639 A1 | 3/2004 | Pavlovic | | |
| 2004/0143602 A1 * | 7/2004 | Ruiz et al. | ............. | 707/104.1 |

(Continued)

FOREIGN PATENT DOCUMENTS

WO    WO 0182255 A1 * 11/2001

OTHER PUBLICATIONS

Tang et al. ("Histological Image Retrieval Based on Semantic Content Analysis," IEEE Trans. Information Technology in Biomedicine, vol. 7, No. 1, Mar. 2003, pp. 26-36).*

(Continued)

Primary Examiner—Yubin Hung
(74) Attorney, Agent, or Firm—Harness, Dickey & Pierce, P.L.C.

(57) ABSTRACT

An Intelligent, dynamic, long-term digital Surveillance Media storage System (ISMS), proposes an intelligent, dynamic, digital media storage mechanism for digital surveillance applications that can analyze media streams in real-time and provide flexible, scalable, and self-adjustable encoding and indexing mechanisms based on actual needs for digital surveillance systems. The system includes several subsystems, such as: (1) a media stream retriever/receiver; (2) a content-based description generator; (3) an intelligent engine with metadata description storage and media file storage (4) an event manager; (5) a media stream writer; and (6) an encoding optimizer.

24 Claims, 6 Drawing Sheets

U.S. PATENT DOCUMENTS

| | | |
|---|---|---|
| 2005/0058431 A1* | 3/2005 | Jia et al. .................. 386/69 |
| 2005/0099498 A1* | 5/2005 | Lao et al. ............... 348/207.99 |
| 2005/0117636 A1* | 6/2005 | Rosenberg et al. ..... 375/240.01 |
| 2005/0123048 A1* | 6/2005 | Kondo et al. ........... 375/240.16 |
| 2005/0229234 A1* | 10/2005 | Amielh-Caprioglio et al. ..................... 725/135 |
| 2006/0245656 A1* | 11/2006 | Shinohara et al. ........... 382/236 |

OTHER PUBLICATIONS

Introduction to MPEG-7 (v4.0), International Oganisation for Standardisation Organisation Internationale De Normalisation ISO/IEC JTC1/SC29/WG11, Mar. 2002.

* cited by examiner

INTELLIGENT, DYNAMIC, LONG-TERM DIGITAL SURVEILLANCE MEDIA STORAGE SYSTEM

FIELD OF THE INVENTION

The present invention generally relates to digital surveillance media storage systems, and relates in particular to intelligent selection and use of various extensible encoding formats to achieve efficient storage of surveillance media data based on analysis of media content and correlated events.

BACKGROUND AND SUMMARY OF THE INVENTION

Surveillance applications usually require recording of all media (video/audio) for later access and retrieval for forensic purposes. Because of constant recording and need to keep archives for a long period of time, such as thirty days to three months or more, today's surveillance system needs either a large amount of videotapes for analog based system, or large amounts of disk space for digital recording and archive systems.

Conventional analog surveillance systems use analog signals to transmit, display, and record on analog-signal-based devices, and they store media archives in long-hour time-lapse tapes. A human expert is required to manage tapes and search and retrieve them manually. In contrast, a digital surveillance system converts analog signals to digital signals and encodes them to compress the data. Since encoding mechanisms are different, sizes of data vary according to the type of encoding process.

Digital surveillances are not only used in a variety application fields, but also have different needs relating to video content in terms of video encoding quality, storage efficiency, and others. Most digital surveillance systems offer only one, or very few, limited media encoding mechanisms.

Some problems of existing, conventional analog surveillance systems is that these systems do not enable convenient archive operations and are very time-consuming for searching and browsing a particular event video from storage archives.

Problems of existing, fixed-encoding-mechanism digital surveillance systems include: (a) a digital surveillance system records video using a fixed constant media rate regardless of the importance of a situation, thus consuming great amounts of storage space; (b) there are no content-based indexing and search systems to locate the target video efficiently; (c) a system provides only one type or very limited and pre-fixed types of media encoding methods; (d) there is no intelligence in encoding mechanism determination, such that manual operation is required to change the encoding type settings; and (e) the stored media is purged to tape or simply deleted if the disk space is full.

For long running operation, the disk space is always near full; therefore, the system needs to continue to purge or delete the media to make space available for new recordings.

An ideal digital surveillance system shall provide dynamic and scalable encoding and indexing methods that are needed based on alarm/event situations and/or actual video contents. The present invention, termed herein an Intelligent, dynamic, long-term digital Surveillance Media Storage System (ISMS), is a long-term digital media storage system with intelligent decision making based on event and content semantics to dynamically select the encoding method for new recording based on application defined priority and accuracy requirements. At the same time, it also, dynamically selects and converts previously recorded media to a less accurate recording format based on time and relative priority between a set of candidate media files and thus, forms a multistage media data compression mechanism that can best reduce the total storage size iteratively. This method traces computing resources with the storage resource to reduce the total system cost. The ISMS system can analyze contents and metadata of media streams, can provide flexible, scalable, and self-adjustable encoding and indexing mechanisms based on user defined rules, and can optimize the media storage in multiple stages according to time and semantically importance factors for digital surveillance systems. The system can include several subsystems, such as: (1) a media stream retriever/receiver; (2) a content-based description generator; (3) an intelligent engine; (4) an event handler; (5) a media stream writer; (6) a search and retrieval engine; (7) domain knowledge profiles; and (8) media file and metadata description index storage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
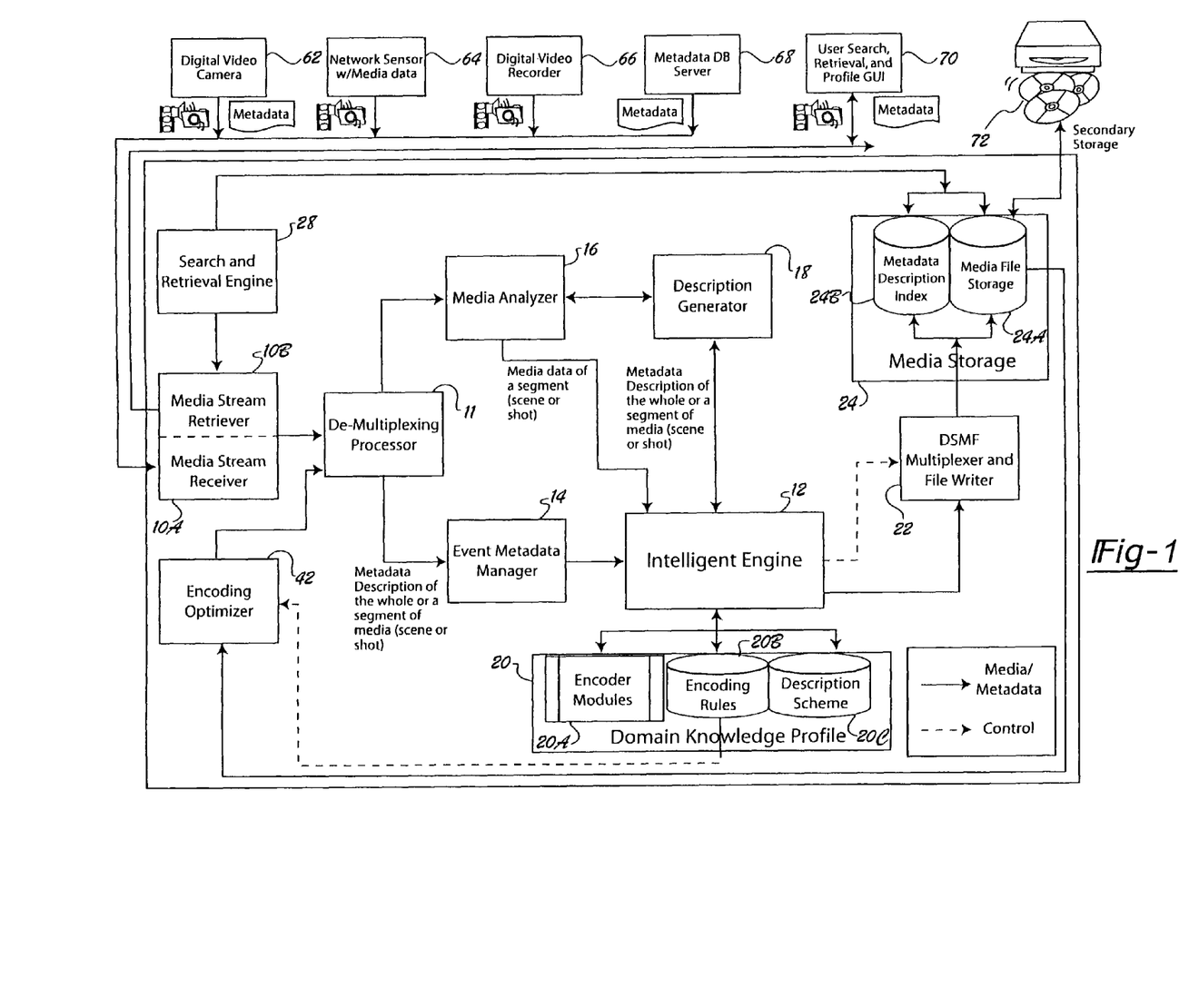
FIG. 1 is a block diagram of the Intelligent, dynamic, long-term digital Surveillance Media storage System (ISMS) in accordance with the present invention.

Referring to FIG. 1, ISMS takes digital media inputs from surveillance devices such as digital video recorders 62, digital network video cameras 64, media or video sensors 66, surveillance event metadata DB server 68, and other devices capable of generating a media stream from locally sensed stimuli. The media stream receiver 10A of ISMS receives media and metadata stream data, and sends data to de-multiplexing processor 11 for de-multiplexing the media data and metadata from the media stream. The media analyzer 16 receives media data to analyze and send results to description generator 18. The event manager 14 receives metadata to analyze events and sends the results to intelligent engine 12 as inputs for decision making.

The intelligent engine 12 gets: (a) segmented media data chunks from media analyzer; (b) metadata and event analysis from event metadata handler; and (c) content description metadata from description generator 18. These inputs will continue feeding into intelligent engine 12 during the analyzing process. The intelligent engine 12 processes inputs, checks rule conditions to determine what types of encoding mechanisms and what kinds of media quality should be used. Table 1 provides some examples of possible conditions and encoding modes.

The encoded data of segments are stored in data buffers until the whole media has been analyzed. Intelligent engine then instructs DSMF multiplexer and file writer 22 to create the DSMF media files and segmented media files, and store them in the media storage 24.

TABLE 1

| | Video Content Condition | Event Condition | Suggested Encoding Mode Selection |
|---|---|---|---|
| 1 | No (motion) change in picture | Normal situation | Low-frame rate or skipping frame still image encoding |
| 2 | Low motion objects | Low motion objects | Still background with Object based encoding |
| 3 | High motion video | High motion objects | Full motion frame-based encoding |
| 4 | High level alert | High Alert or alarm | Full motion high quality frame-based encoding |
| 5 | User-defined conditions | User-defined conditions | User-defined encoding methods |

Most of surveillance applications perform twenty-four hours, seven days a week type of monitoring and recording, and the system generates large amounts of recording archives. Such systems can take advantage of intelligent dynamic encoding methods and storage optimization via multiple stage refinements to reduce the storage demands. As time goes by, most media archive files become less important unless there are events associated with the files or the semantic of the file contents are important. ISMS can re-encode media archives based on these factors to optimize the media storage. Although some of the applications, such as banks, may need to store the original video clips without cuts (for no motion condition), these applications can still gain the advantages from other types of encoding mechanisms and content analysis process with content-based indexing for fast search.

When the data is old and ready to be copied to other, off-line, secondary storage 72 devices such as tape or DVD-R, the system can still keep a reduced set of metadata and probably thumbnails to achieve fast retrieval based on metadata such as time, event, place, face, color, shape, and other content characteristics. The amount of data kept in metadata form is many orders of magnitude smaller than the compressed media. Therefore, the metadata can support online browsing. When a decision is made after the online browsing, specific tapes can be retrieved for further investigation. As result, this system can provide a virtual, semantic-based search interface for a very large amount of media data even if the data has been transferred to the secondary storage.

Moreover, a user-interface 70 of the ISMS system can permit a user to select media quality and encoding modes, define and select customized conditions, and/or select pre-defined conditions. The user interface 70 can also allow a user to set relationships between selected media quality, selected encoding modes, and selected conditions. These configurations can be stored in domain knowledge profiles 20. Further, the user interface 70 can allow a user to retrieve media streams from media file storage 24A using metadata description index 24B via search and retrieval engine 28 and media stream retriever 10B.

The domain knowledge profiles 20 contain: (a) rules 20B for selecting an encoding mode, which can be configured based on the actual needs of the applications; (b) the selectable encoder modules 20A which can be extended by importing a new encoder and registering it in the system; and (c) metadata description scheme 20C. The system can use either built-in or extensible configuration definition sets, called domain knowledge profiles, containing settings and rules to determine the best actions for different application domains and real situations. Encoding optimizer 42 follows the rules 20B defined in the profiles to make decisions to select stored files for optimization based on time and importance. Thus, the system can dynamically and intelligently select a proper encoding mechanism to record or transcode the video to long-term surveillance media storages. As a result, this flexible profile architecture allows extending the system to fit any application needs.

Figure 2:
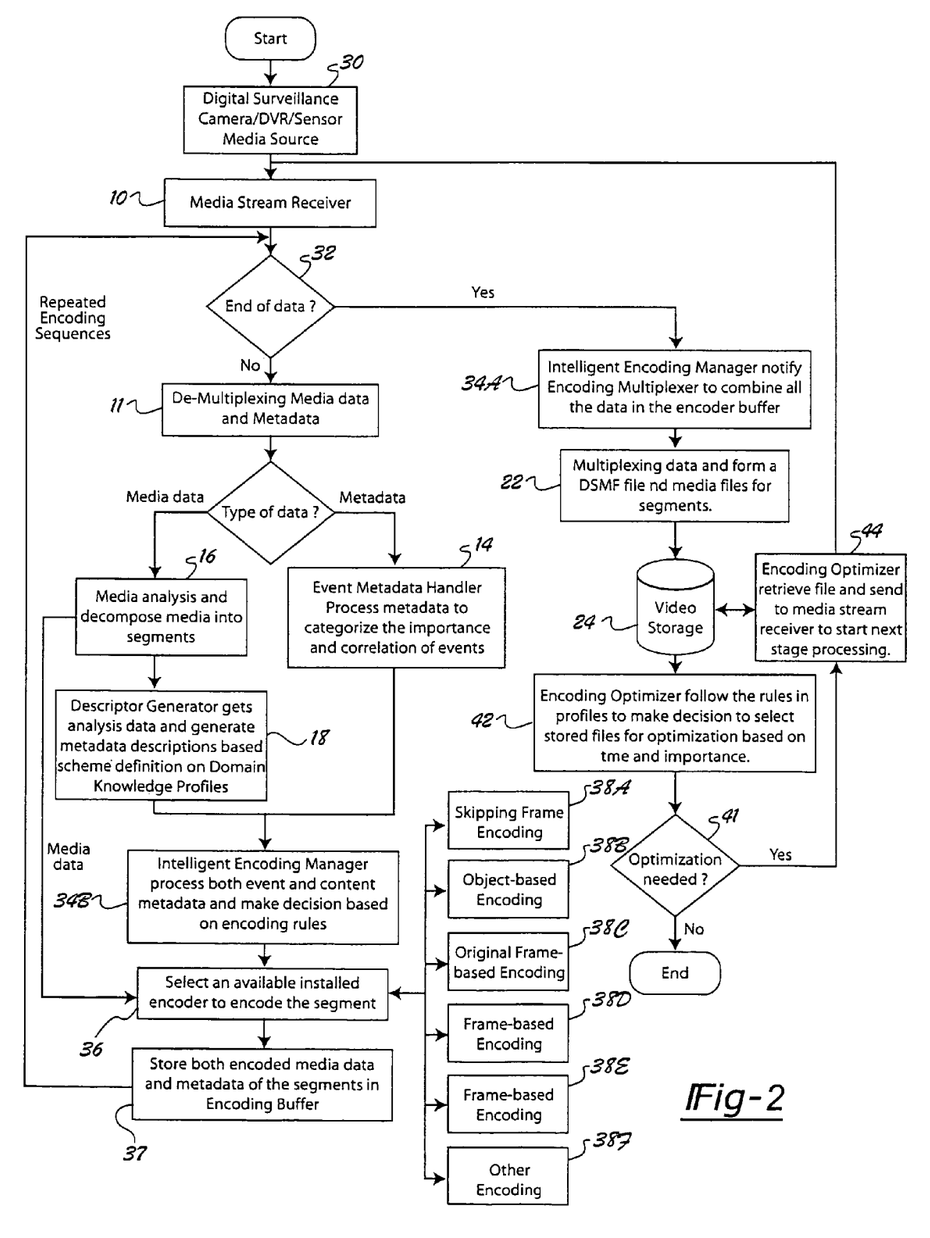
FIG. 2 is a flow diagram illustrating functionality of the ISMS in accordance with the present invention.

Functionalities of the system include digital surveillance information collection, media information processing, automated media description generation, intelligent encoding method selection, and media playback. Turning to FIG. 2, the dataflow in the system starts at a media source 30 and continues through media stream receiver 10, de-multiplexing processor 11, event manager 14, media analyzer 16, descriptor generator 18, and other system elements until the data ends at 32. The other system elements can be functionally categorized in part as an intelligent coding manager 34A and 34B that routes data to coding mode selector 36. In turn, coding mode selector 36 conditionally routes data through encoding function blocks 38A-38F, including skipping frames encoding function block 38A, object-based encoding function block 38B, frame-based encoding function blocks 38C-38E, and other block 38F as they are made available. Encoding multiplexer and file writer 22 receives the encoded data from intelligent coding manager 38A and routes repeated encoding sequences back to media stream receiver 10 to see if the end of data 32 condition is met. When it is at end of the data stream, intelligent encoding manager 34A notifies encoding multiplexer and file writer 22 to retrieve encoded data and MPEG7 descriptors from media data and metadata buffers 37, and create appropriate files in media storage datastore 24.

Encoding optimizer 42 periodically check if there is media file for optimization based on rules defined in profiles. If there is a file that needs to be optimized as at 41, encoding optimizer 42 retrieves the file 44 from media storage datastore 24 and sends it to media stream receiver 10 to start another stage of the encoding process for better optimization.

Figure 3:
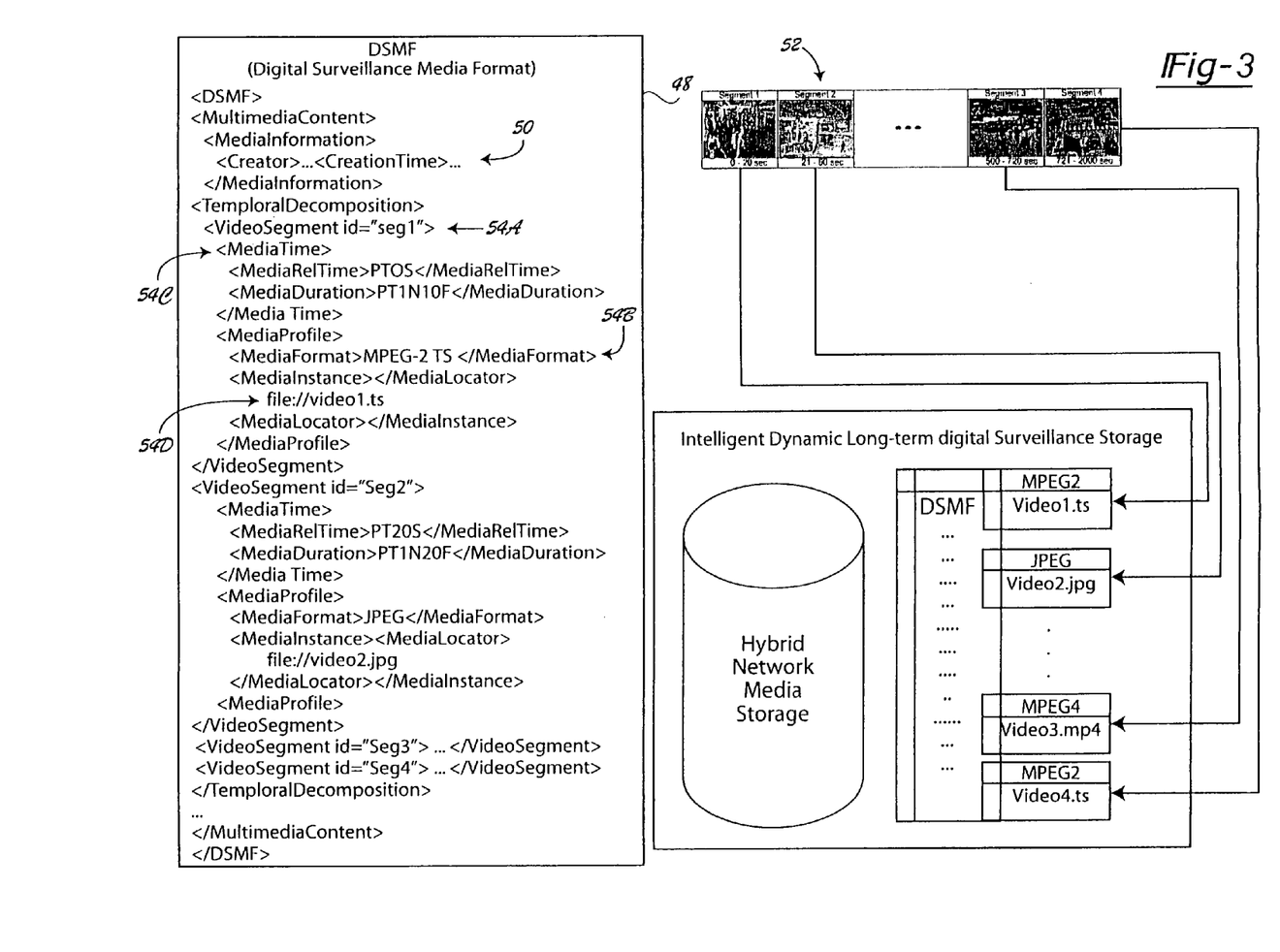
FIG. 3 is a block diagram illustrating a Digital Surveillance Media Format (DSMF) employed by the ISMS in accordance with the present invention.

Turning now to FIG. 3, the ISMS system proposes a new media format, called Digital Surveillance Media Format (DSMF), which accommodates dynamic encoding media storage and content description for digital surveillance systems. DSMF is based on MPEG-7 technology, and it uses MPEG-7 standard descriptors and extended customized descriptors to describe the processed long-term media.

The format 48 contains the following: (a) media creation information 50; (b) media content that has been divided into multiple video segments (scenes or shots) 52; (c) media segmentation 54A with media encoding 54B, media type, time 54C, and media storage location 54D; and (d) content description of media segmentation.

Figure 4:
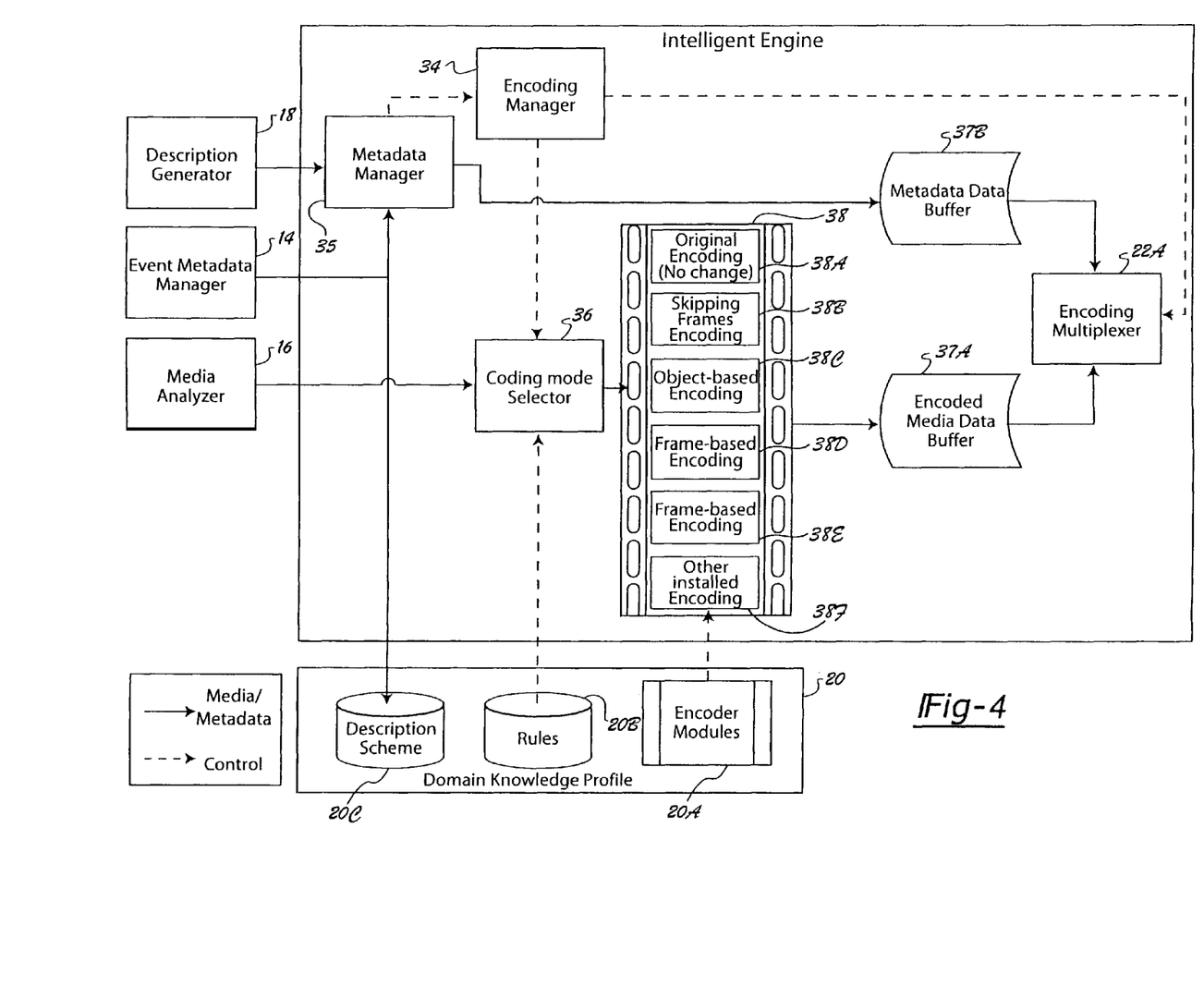
FIG. 4 is a block diagram illustrating components of an intelligent engine in accordance with the present invention.

Turning now to FIG. 4, the intelligent engine has several components. For example, metadata manager 35 receives metadata inputs from both event metadata manager 14 and description generator 18, and parses data against description scheme 20C defined in the domain knowledge profile 20. Metadata manager 35 processes the metadata, provides event and content semantic information to encoding manager 34, merges metadata, and stores metadata descriptions in the metadata buffer 37B. Encoding manager 34 notifies and provides event information to coding mode selector 36, which selects a proper encoding method based on rules 20B and available encoders installed in encoder modules 20A. Coding mode selector 36 passes the media segment data received from media analyzer 16 to one or more selected encoding modules 38. Examples of encoding modules 38A-38F are explained above, and the skipping frames encoding block 38A is particularly explained below. The processing results of encoding are queued and temporarily stored in encoded media data buffer 37A until the end of the media file is reached. Encoding manager 34 instruct encoding multiplexer 22A to get data from both media data buffer 37A and metadata buffer 37B to form the DSMF file and segments files.

The encoding modules 20A in the system are configurable based on the application and user needs. For example, the user can install new encoder modules and define the rules to use any of these modules. An encoding module can use a particular encoder with different profile@level which means different pre-defined quality, sampling rates, and resolutions provided by the encoder.

An unchanged frame-based encoding format can be employed as an initial phase of the skipping frames encoding format. Accordingly, an unchanged portion of an image is stored in relatively high resolution as relatively few frames over time that represent a background. A background frame is updated regularly to adapt to changing background conditions.

The skipping frame encoding 38A detects if the changes, including motion activity and color, of image frames is less than a pre-defined threshold. If so, the frames of the segment can be skipped as repeated, unchanged frames, thus keeping only certain amounts of full image frames (or still images) with time stamp metadata in it for video reconstruction. For example, the media can be received in the compression domain, with base frames and motion vectors for gradually changing the base frame (or an enhanced frame) into a next base frame (or enhanced frame). In this case, the motion vectors between base frames can be analyzed to determine if sufficiently rapid change is occurring based on the predefined change threshold. If not, then frames can be skipped. However, occasional base frames can be preserved and even enhanced with enhancement layers at a predetermined rate that can be set by a user in a related profile. In this way, slow changes, such as changes in lighting conditions, can be recorded, even if those changes are not rapid enough to exceed the predefined threshold.

It should be readily understood that the media analyzer of the present invention can semantically analyze these base frames (or enhanced frames) before the skipping frames encoder is selected. Accordingly, these base frames can be analyzed to determine if a complete lack of light condition has been reached, which can result in an alarm. Similarly, a slow moving robot under control of an interloper can be detected, resulting in an alarm. As a result, an interloper cannot foil the security system by slowly lowering lighting conditions until the cameras are useless, or by using a very slow, heat-controlled robot to avoid motion detection.

Figure 5:
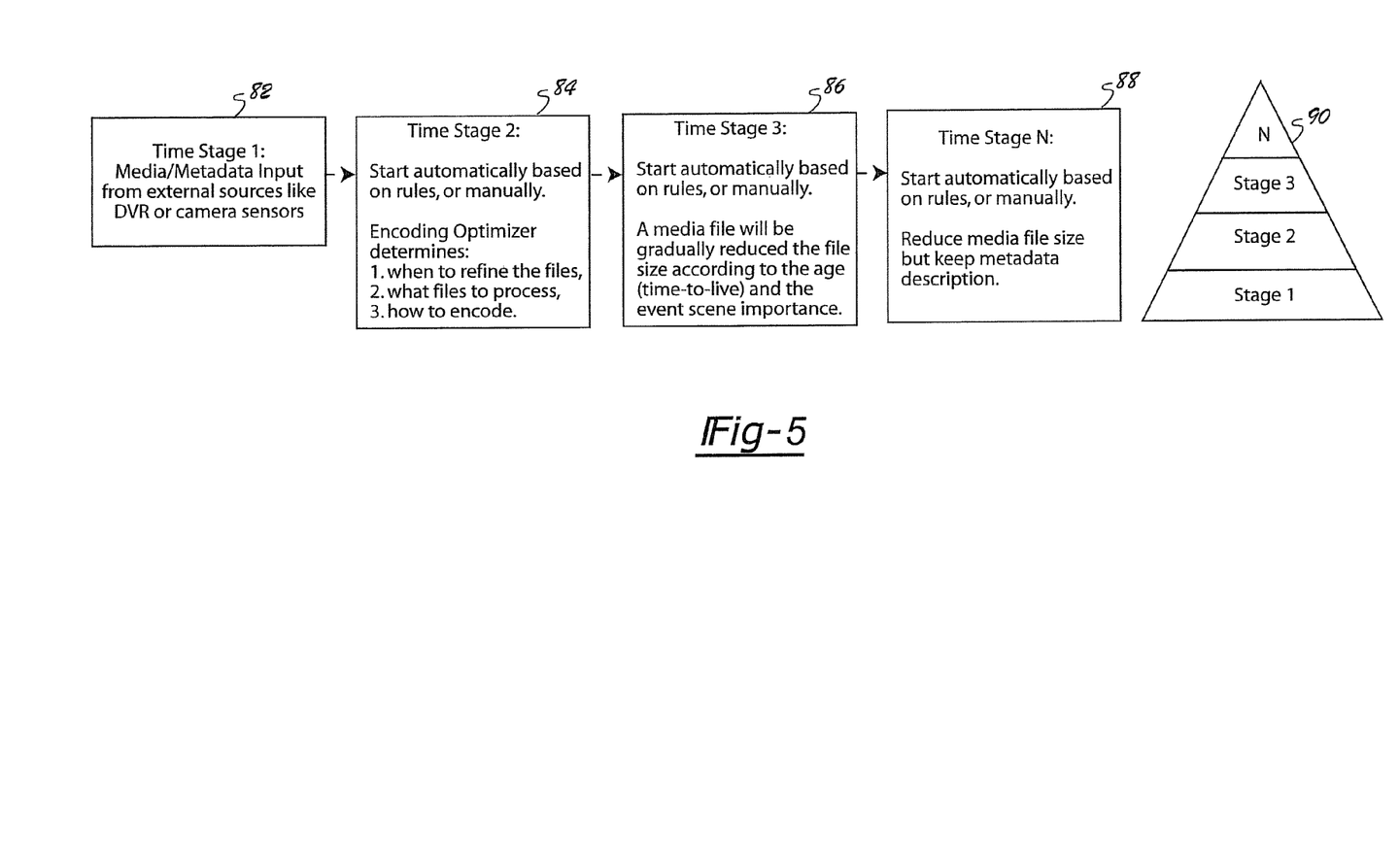
FIG. 5 is a flow diagram illustrating multiple stage storage optimization in accordance with the present invention.

Turning to FIG. 5, an encoding process according to the present invention includes several stages. Starting at a first time stage 82, media and/or metadata input is received from external sources. Then, at a second time stage 84, an encoding optimizer determines when to define files, what files to process, and how to encode the files, so that the files are stored in buffers and written to a searchable storage medium. Next, at a third time stage 86, size of a media file is gradually reduced according to age (time-to-live) and event scene importance. Finally, in an Nth time stage 88, files are deleted or otherwise reduced with metadata descriptions retained, and/or files are moved to non-searchable storage archives with a searchable directory for the non-searchable storage archives formed from metadata of the archived media. Stage hierarchy 90 indicates that searchable storage requirements for a file are reduced over time.

Figure 6:
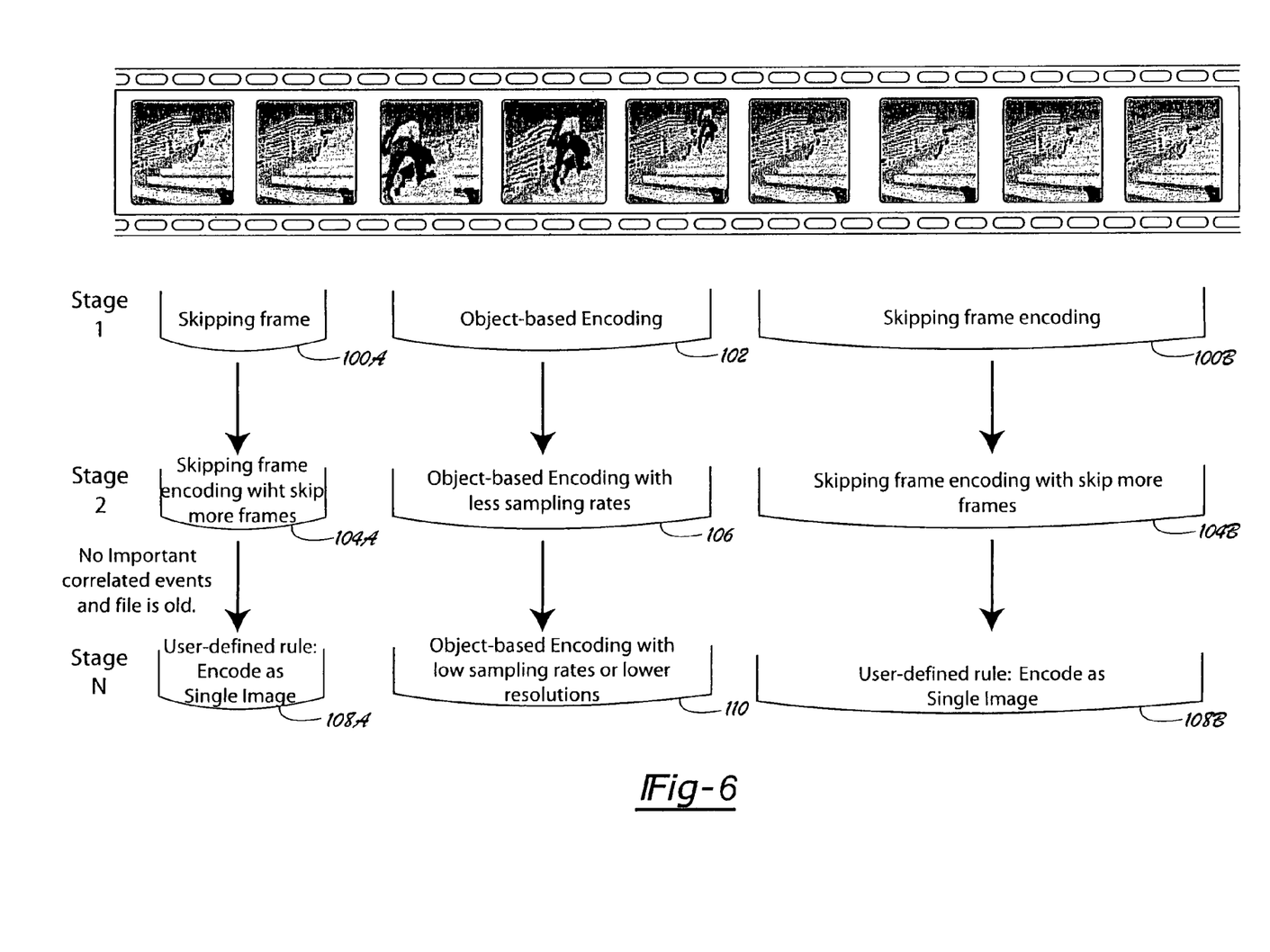
FIG. 6 is a flow diagram illustrating an example of different encoding methods used for optimization in accordance with the present invention.

Turning now to FIG. 6, an example of encoding according to the present invention reveals that at a first stage, skipping frames encoding is used at 100A and 100B for relatively unchanging frames, while object based encoding is used at 102 for frames with relatively more changing content. Then, at a second stage, more frames are skipped for the skipping frames encoded portions at 104A and 104B, and the object-based encoded portion is re-encoded at a lower sampling rate at 106. Subsequently, at an Nth stage, the skipped frames encoded portions are converted to single images at 108A and 108B in accordance with a user-defined rule, and the object-based encoded portions are re-encoded at even lower sampling rates and lower resolutions at 110.

The present invention can provide the following advantages for a long-term digital surveillance media storage system: (a) reduce a great amount of long-term digital surveillance media storage space; (b) efficiently provide fast search capability for particular clips (e.g., as for evidence) from large amounts of long-term surveillance video storage; (c) provide intelligent, dynamic; and scalable recording quality control management; (d) acquire media content description data during analyzing and encoding processes; and (e) provide a content description for easy search and better understanding of media clips. The invention can be used with most digital surveillance systems that require storing media (video and/or audio) contents in recorders and long-term storage systems.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A digital surveillance media storage system, comprising:
a media analyzer receiving a media stream and decomposing the media stream into a plurality of media segments based on scenes recorded in the media stream, each media segment of the plurality of media segments having an indicia of a starting location for the media segment in the media stream and a duration time for the media segment;
an encoding format selector receiving content semantic information for each media segment of the plurality of media segments and selecting an encoding format for each media segment of the plurality of media segments from plural encoding formats based on the content semantic information for that media segment and scenes recorded in that media segment, wherein the encoding format selector selects:
a low-frame rate or skipping frame encoding when no change in motion is detected;
an object based encoding when low motion objects are detected; and
a frame-based encoding when high motion video is detected;
an encoder engine receiving the plurality of media segments from the media analyzer and encoding the media segments according to the encoding format selected by said encoding format selector, where different encoding formats are selected for different media segments; and a file writer receiving the plurality of encoded media segments from the encoder engine and storing information describing the plurality of encoded media segments for the media stream in a single media file.

2. The system of claim 1, wherein the media file further includes metadata description information for the media stream in the media file.

3. The system of claim 1, further comprising an encoding optimizer periodically re-encoding encoded media streams already stored in the media file to reduce storage utilization while maintaining accuracy of data based on a predefined set of application criteria, wherein a sampling rate of the re-encoding is changed based on an age of the media stream to be re-encoded.

4. The system of claim 3, wherein said encoding optimizer processes the media file in multiple stages over time, each stage including dynamic selection of an encoding format based on an amount of available storage space, stream lifetime, stream priority, and application-defined accuracy requirements.

5. The system of claim 4, wherein the plural encoding formats include a skipping frames encoding format that can be dynamically selected in multiple stages of file encoding processes over a life time of the media file in the system.

6. The system of claim 5, wherein the media file propagates over time from relatively high accuracy and large size to relatively low accuracy and small size, the media file eventually being reduced to only a description of the media content based on MPEG7 before it is archived to secondary storage.

7. The system of claim 1, wherein said encoding format selector responds to semantic based content extraction results and event metadata to decide importance of an image before selection of an encoding method.

8. The system of claim 7, wherein the media file is re-processed after a predefined period of time to further reduce its size, and semantic based multi-stage compression is driven by user defined rules.

9. The system of claim 1, wherein the plural encoding formats include an unchanged frame-based encoding format, wherein an unchanged portion of an image is stored in high resolution as a background frame.

10. The system of claim 9, wherein a background frame is updated regularly to adapt to changing background conditions.

11. The system of claim 1, further comprising an event manager receiving and managing events of the media stream, wherein said encoding format selector further receives input from said event manager and selects the one of plural encoding formats based on the input.

12. The system of claim 11, further comprising a media stream receiver receiving a media stream and routing received events to said event manager while routing received media stream to said media analyzer.

13. The system of claim 1, further comprising a descriptor generator supplying descriptors for the media segments based on analysis of the media stream.

14. The system of claim 13, further comprising a file writer receiving encoded media segments and descriptors and storing the encoded media segments with the descriptors in the media file.

15. A digital surveillance media storage system of claim 1, wherein the single media file includes (a) media creation information; (b) pointers to the plurality of encoded media segments; (c) media segmentation information, of the plurality of encoded media segments, including media encoding, media type, time, and media storage location; and (d) content description of the plurality of encoded media segments.

16. The system of claim 1, wherein the media analyzer selects a plurality of base frames in a media segment to determine an occurrence of incremental changes in frames that do not exceed the first predetermined threshold.

17. The system of claim 1, wherein the importance of the media contents become less important as time passes.

18. A digital surveillance media storage system, comprising:
a media analyzer receiving a media stream and decomposing the media stream into a plurality of media segments based on scenes recorded in the media stream, each media segment of the plurality of media segments having a duration time associated therewith;
an encoding format selector receiving content semantic information for each media segment of the plurality of media segments and selecting an encoding format for each media segment of the plurality of media segments based on the content semantic information for that media segment and scenes recorded in that media segment, wherein the encoding format selector selects
a low-frame rate or skipping frame encoding when no change in motion is detected;
an object based encoding when low motion objects are detected; and
a frame-based encoding when high motion video is detected;
an encoder engine receiving the plurality of media segments from the media analyzer and encoding the media segments according to the encoding format selected by said encoding format selector, where different encoding formats are selected for different media segments
a file writer receiving the plurality of encoded media segments from the encoder engine and storing information describing the plurality of encoded media segments for the media stream in a single media file; and
an encoding optimizer periodically retrieves the media file and selectively re-encodes a subset of the plurality of media segments which comprise the media stream.

19. The system of claim 18 where the encoding optimizer re-encodes media segments in the subset of media segments in a manner that reduces the size of a given media segment based on the content semantic information associated with the given media segment.

20. The system of claim 16 where the encoding optimizer re-encodes media segments in the subset of media segments in a manner that reduces the size of a given media segment according to age of the given media segment and content semantic information associated with the given media segment.

21. The system of claim 18 further comprises a description generator that supplies descriptors for each media segment, wherein the encoding optimizer selectively deletes media segments from the media file but retains descriptors for the media segments in the media file.

22. A digital surveillance system, comprising:
a plurality of surveillance cameras monitoring a surveillance domain and generating a media stream of the surveillance domain;
a domain knowledge profile defining settings of the digital surveillance system based on security requirements of the surveillance domain;
a media analyzer receiving the media stream and decomposing the media stream into a plurality of media segments based on scenes recorded in the media stream, each media segment of the plurality of media segments having an indicia of a starting location for the media segment in the media stream and a duration time for the media segment;

an encoding format selector receiving content semantic information for each media segment of the plurality of media segments and selecting an encoding format for each media segment of the plurality of media segments from plural encoding formats based on a) the content semantic information for that media segment, b) scenes in that media segment, and c) the domain knowledge profile, wherein the encoding format selector selects a low-frame rate or skipping frame encoding when no change in motion is detected;

an object based encoding when low motion objects are detected; and a frame-based encoding when high motion video is detected;

an encoder engine receiving the plurality of media segments from the media analyzer and encoding the media segments according to the encoding format selected by said encoding format selector, where different encoding formats are selected for different media segments; and a file writer receiving the plurality of encoded media segments from the encoder engine and storing information describing the plurality of encoded media segments for the media stream in a single media file.

23. A digital surveillance system of claim 22, wherein the surveillance domain is a site to be monitored by the plurality of surveillance cameras; wherein the dominant knowledge profile further contains user configurations, for the surveillance system, of media quality, selected encoding modes, and customized conditions.

24. A digital surveillance system of claim 23, wherein the domain knowledge profile further contains:
   (a) rules for selecting an encoding mode, which is configured based on actual needs of surveillance applications of the surveillance system;
   (b) selectable encoder modules which are extendable for importing a new encoder and registering the new encoder in the surveillance system;
   (c) metadata description scheme;
   (d) settings and rules for determining actions for different application domains and security situations of the site.

* * * * *

UNITED STATES PATENT AND TRADEMARK OFFICE
CERTIFICATE OF CORRECTION

| | | |
|---|---|---|
| PATENT NO. | : 7,751,632 B2 | Page 1 of 1 |
| APPLICATION NO. | : 11/058558 | |
| DATED | : July 6, 2010 | |
| INVENTOR(S) | : Lipin Liu et al. | |

It is certified that error appears in the above-identified patent and that said Letters Patent is hereby corrected as shown below:

On the title page, item (54), and in column 1, line 2, the word "Surveilance" in the title of the invention should read -- Surveillance --

In column 8, line 33, claim 18, "segments" should read -- segments; --

In column 8, line 46, claim 20, "The system of claim 16" should read -- The system of claim 18 --

In column 10, line 19, claim 24, "metadata description scheme;" should read -- metadata description scheme; and --

Signed and Sealed this

Second Day of November, 2010

David J. Kappos
*Director of the United States Patent and Trademark Office*